(12) United States Patent
Jones, Jr.

(10) Patent No.: US 9,511,808 B1
(45) Date of Patent: Dec. 6, 2016

(54) MOTORCYCLE CONTROL PADS

(71) Applicant: James Lee Jones, Jr., Watsonville, CA (US)

(72) Inventor: James Lee Jones, Jr., Watsonville, CA (US)

( * ) Notice: Subject to any disclaimer, the term of this patent is extended or adjusted under 35 U.S.C. 154(b) by 0 days.

(21) Appl. No.: 14/805,270

(22) Filed: Jul. 21, 2015

(51) Int. Cl.
  *B62J 25/00* (2006.01)
  *B62J 1/02* (2006.01)
  *B62K 11/02* (2006.01)

(52) U.S. Cl.
  CPC . *B62J 1/02* (2013.01); *B62K 11/02* (2013.01)

(58) Field of Classification Search
  CPC ................ B62J 1/02; B62J 1/22; B62J 1/26
  USPC ...................... 280/283, 288.4, 293
  See application file for complete search history.

(56) References Cited

U.S. PATENT DOCUMENTS

| | | | | |
|---|---|---|---|---|
| 4,650,204 | A * | 3/1987 | Bothwell | B62J 17/065 280/304.3 |
| 7,364,195 | B2 * | 4/2008 | Tsunoda | B60R 21/04 180/219 |
| 7,914,032 | B2 * | 3/2011 | Schemp | B62J 25/00 280/291 |
| 8,333,398 | B2 * | 12/2012 | Oved | B62H 1/12 280/304.3 |
| 2009/0184489 | A1 * | 7/2009 | Smith | B62J 25/00 280/291 |

* cited by examiner

*Primary Examiner* — Jacob Knutson
(74) *Attorney, Agent, or Firm* — Donald R. Boys; Central Coast Patent Agency, Inc.

(57) ABSTRACT

A control pad system for a motorcycle has two forward control pads configured to engage a forward surface of a rider's knees or legs with the rider's feet on foot pegs of the motorcycle, the forward control pads mounted to be stationary with frame elements of the motorcycle, wherein the positions of the forward control pads constrain the rider's legs from forward motion, enabling the rider to exert pressure on the control pads to resist motion relative to the motorcycle induced by instances of deceleration.

12 Claims, 5 Drawing Sheets

MOTORCYCLE CONTROL PADS

BACKGROUND OF THE INVENTION

1. Field of the Invention

The invention is in the technical area of motorcycles, and applies more particularly to maintaining control of a motorcycle under conditions of acceleration and deceleration.

2. Description of Related Art

Traditionally, the only means of stabilizing and controlling a motorcycle are with the handlebars. Decelerating and accelerating riding conditions that go beyond casual experience require the rider to increasingly grip the handlebars with greater force to prevent the rider's body from going over the handlebars or from falling off the back of the motorcycle.

Under extreme riding conditions, the shifting weight of the average motorcycle rider is a force far too great for the hands and arms to securely manage the required pushing and pulling of the handlebars for stability. What is clearly needed is to provide a way for the rider to secure his or her weight to the motorcycle.

BRIEF SUMMARY OF THE INVENTION

In one embodiment of the invention a control pad system for a motorcycle is provided, comprising two forward control pads configured to engage a forward surface of a rider's knees or legs with the rider's feet on foot pegs of the motorcycle, the forward control pads mounted to be stationary with frame elements of the motorcycle, wherein the positions of the forward control pads constrain the rider's legs from forward motion, enabling the rider to exert pressure on the control pads to resist motion relative to the motorcycle induced by instances of deceleration.

In another embodiment the control pad system comprises additionally two rearward control pads configured to engage a backside surface of a rider's knees or legs with the rider's feet on foot pegs of the motorcycle, the rearward control pads mounted to be stationary with frame elements of the motorcycle, wherein the positions of the rearward control pads constrain the rider's legs from rearward motion, enabling the rider to exert pressure on the rearward control pads to resist motion relative to the motorcycle induced by instances of acceleration.

In one embodiment each forward control pad is in shape of a padded bar to engage the from of the rider's knee, and each rearward control pad is in shape of a round puck to engage the back of the rider's knee. Also in one embodiment all four control pads are made a contiguous part of a seat assembly, and are added to the motorcycle by adding the seat assembly to the motorcycle. In one embodiment the four control pads are mounted to a saddle-like unit that is placed over the motorcycle frame before the seat is added, and adding the seat secures the saddle-like unit and hence the control pads to the motorcycle frame. In one embodiment a first forward and a first rearward control pad is secured to a first mounting pad, a second forward and a second rearward control pad is secured to a second mounting pad which is a mirror image of the first mounting pad, and each mounting pad is fastened to the frame of the motorcycle seat under upholstery of the motorcycle seat.

In one embodiment a first forward and a first rearward control pad is secured to a first mounting pad, a second forward and a second rearward control pad is secured to a second mounting pad which is a mirror image of the first mounting pad, and each mounting pad is fastened to the frame of the motorcycle under the frame of the motorcycle seat. Also in one embodiment the forward and rearward control pads on each side are mounted directly to frame elements of the motorcycle on each side. Also in one embodiment one or both of the forward and the rearward control pads each comprise a plurality of elements mounted and arranged to follow the shape of the rider's legs fore and aft.

In another aspect of the invention A method for maintain position on a motorcycle, comprising steps of mounting two forward control pads configured to engage a forward surface of a rider's knees or legs with the rider's feet on foot pegs of the motorcycle, one each mounted on each side of the motorcycle to be stationary with frame elements of the motorcycle, and placing the legs against the forward control pads by the rider, and exerting pressure on the forward control pads with the knees and legs as necessary to maintain position on the motorcycle during deceleration.

In one embodiment the method further comprises mounting two rearward control pads configured to engage a backside surface of a rider's knees or legs with the rider's feet on foot pegs of the motorcycle, one each of the rearward control pads mounted on each side of the motorcycle to be stationary with frame elements of the motorcycle, and placing the legs between the forward and the rearward control pads by the rider, and exerting pressure on the forward and rearward control pads with the knees and legs as necessary to maintain position on the motorcycle during acceleration and deceleration.

In one embodiment each forward control pad is in shape of a padded bar to engage the from of the rider's knee, and each rearward control pad is in shape of a round puck to engage the back of the rider's knee. Also in one embodiment all four control pads are made a contiguous part of a seat assembly, and are added to the motorcycle by adding the seat assembly to the motorcycle. Also in one embodiment the four control pads are mounted to a saddle-like unit that is placed over the motorcycle frame before the seat is added, and adding the seat secures the saddle-like unit and hence the control pads to the motorcycle frame. Also in one embodiment a first forward and a first rearward control pad is secured to a first mounting pad, a second forward and a second rearward control pad is secured to a second mounting pad which is a mirror image of the first mounting pad, and each mounting pad is fastened to the frame of the motorcycle seat under upholstery of the motorcycle seat.

In one embodiment first forward and a first rearward control pad is secured to a first mounting pad, a second forward and a second rearward control pad is secured to a second mounting pad which is a mirror image of the first mounting pad, and each mounting pad is fastened to the frame of the motorcycle under the frame of the motorcycle seat. Also in one embodiment the forward and rearward control pads on each side are mounted directly to frame elements of the motorcycle on each side. And in one embodiment one or both of the forward and the rearward control pads each comprise a plurality of elements mounted and arranged to follow the shape of the rider's legs fore and aft.

DETAILED DESCRIPTION OF THE INVENTION

Figure 1:
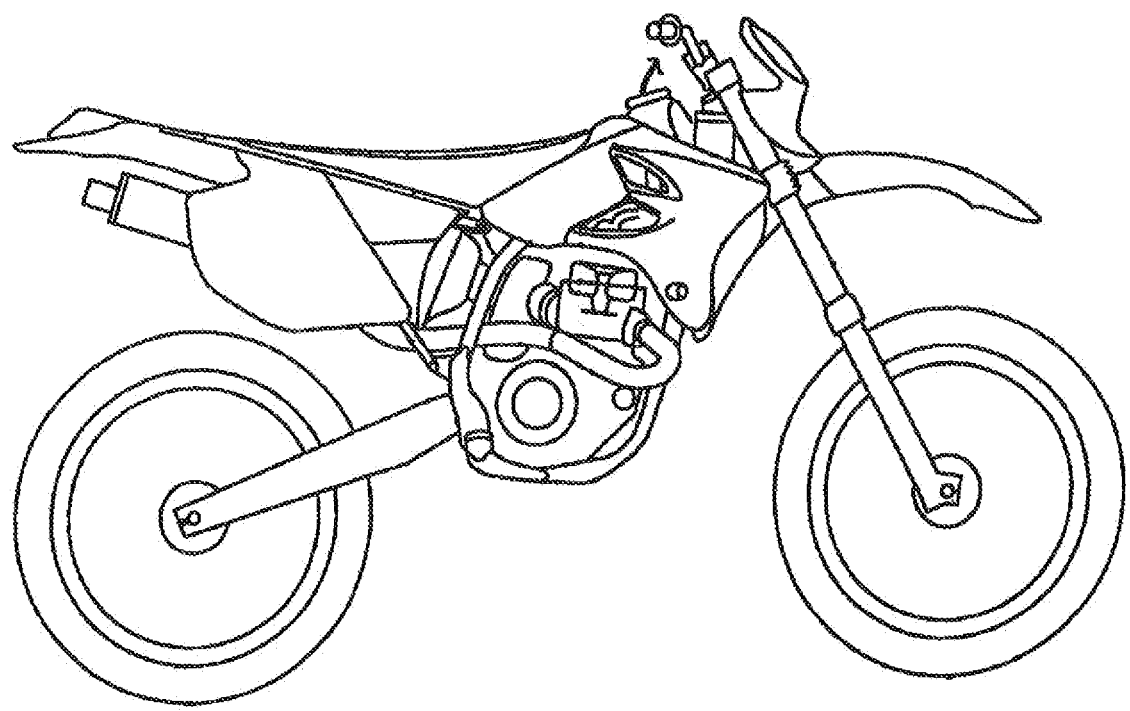
FIG. 1 is a side elevation view of a motorcycle in the prior art.

In one embodiment of the invention control pads are placed onto a motorcycle that will allow a standing rider to grip the motorcycle with his or her knees and prevent the knees from moving forward and backward, and will greatly increases ability of the rider to position and maintain weight to a desired position for optimum control and safety. In an embodiment of the invention the rider is allowed to easily move the legs out, around and return into the control-pads while moving in and out of a seated position and while traversing terrain requiring a full range of technical ridding techniques.

Elements in embodiments of the invention can attach to the motorcycle in four different embodiments:

1) In the first embodiment the control-pads are part of the motorcycle seat and seat cover, so that the control-pads are a contiguous functioning parts of the motorcycle seat with a pair of control-pads on the left and right side of the seat. The control-pad seat may be custom made for each type, make, model and year of motorcycle. The control-pad positions are adjustable, replaceable and may vary in size.

2) In a second embodiment the control-pads are a single unit that fits between the motorcycle seat and motorcycle frame similar to a saddle on a horse. The control-pads are securely locked into place when the motorcycle seat is re-mounted onto the motorcycle frame in the way it was originally designed to attach. The control-pad positions are adjustable, replaceable and vary in sizes.

3) In a third embodiment the control-pads are two units with two control-pads per unit. Each unit is retrofitted onto each side of a stock motorcycle seat. The control-pad positions are adjustable, replaceable and vary in sizes.

4) In a fourth embodiment each control-pad is a separate unit that is attached directly to the motorcycle with two pads on the left side and two pads on the right side of the motorcycle.

In various embodiment the Motorcycle control-pads are ideally mounted and secured in a location on the motorcycle for optimal body weight movement and distribution while the rider is crouching or standing. The pads may be made of rubber-like material that is hard and dense enough to prevent sudden and gradual forces from the forward and backward movement of the rider's knees, including kinetic energy and weight of the rider, yet soft enough to provide comfort to the knees and legs of the rider as they move in, out, around and back into position of the control-pads.

In various embodiments there are two control-pads mounted on each side of the motorcycle, which prevent each knee and leg from sliding forward and backward. A forward pad on each side is preferably an elongated bar against which the front of the rider's knee may bear. A rearward pad may be a round puck-like extension which may engage with the back of the rider's knee.

In various embodiments the control-pads may be composed of any type of material that may satisfy the needs of the rider.

In various embodiments the control-pads can take on any size that may satisfy the needs of the rider.

In various embodiments the control-pads can take on any position that may satisfy the needs of the rider to keep the knees from sliding too far forward and backward.

Generally, per each side of the motorcycle, one control-pad is positioned at the front of the knee as the rider is standing up on the motorcycle foot pegs and the other control-pad is position behind the knee near the rider's upper calf area.

Figure 2A:
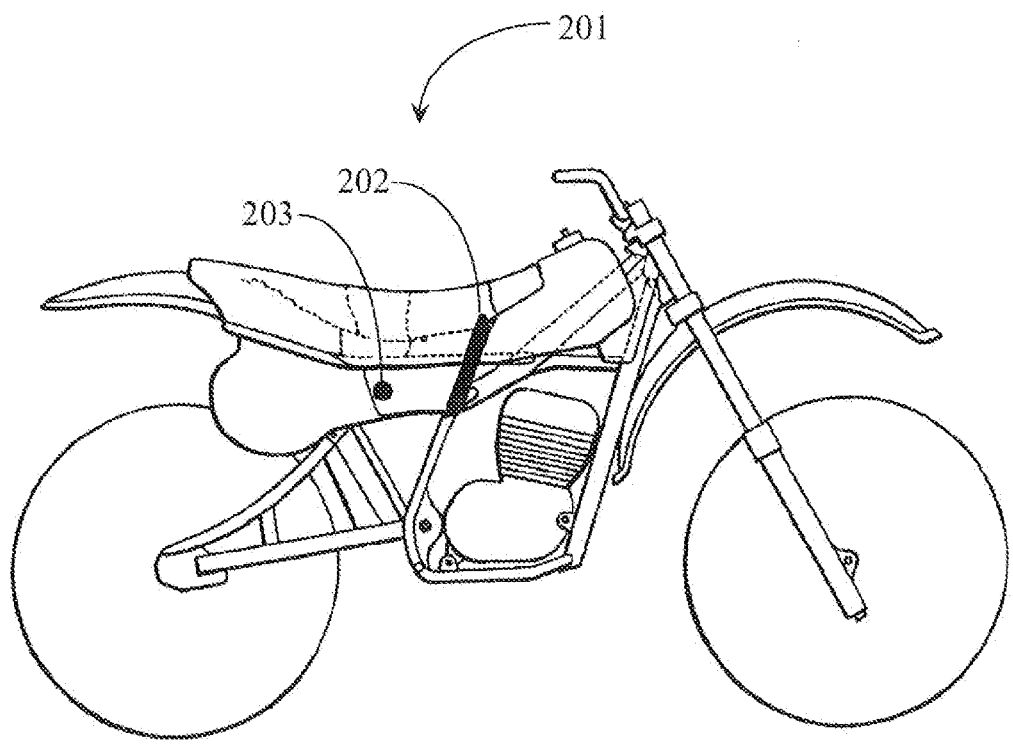
FIG. 2a is a side elevation view of a motorcycle in an embodiment of the invention.
Figure 2B:
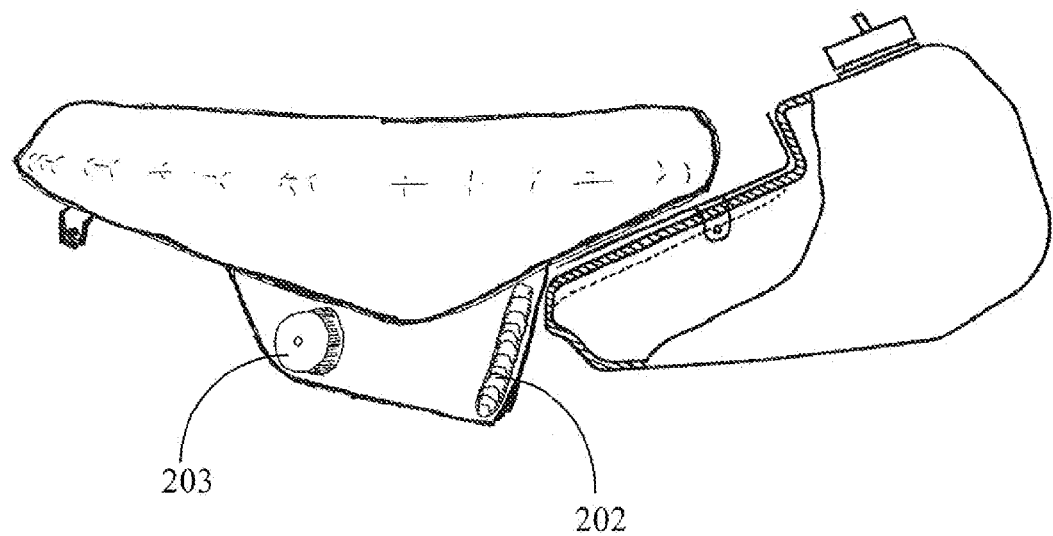
FIG. 2b is an enlarged view of the seat area and elements of the motorcycle of FIG. 2a in an embodiment of the invention.

Version 1—FIG. 2b) In this embodiment the control-pads are designed as part of the motorcycle seat and seat cover, so that the control-pads are a contiguous functioning part of the motorcycle seat with a pair of control pads 202 & 203 on the left and right side of the seat. The control pad seat is custom made for each type, model and year of motorcycle. The control pad positions are adjustable, replaceable, vary in shapes, sizes, colors and type of material with a variety of density.

Figure 3A:
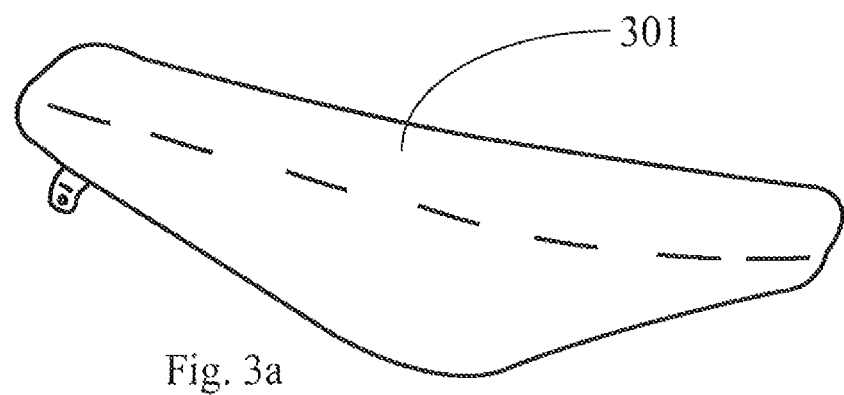
FIG. 3a is a side elevation view of a typical motorcycle seat with the frame pointing to the right.
Figure 3B:
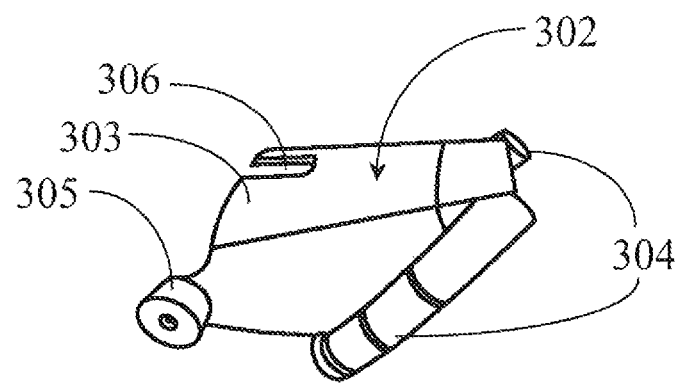
FIG. 3b is side elevation view of an embodiment of the invention as it would fit under the motorcycle seat.

Version 2—FIG. 3b) In this embodiment the control-pads are a single unit that fits between the motorcycle seat (FIG. 3a) and the motorcycle frame similar to a saddle on a horse. The control pads are securely locked into place when the motorcycle seat is re-mounted onto the motorcycle frame in the way it was originally designed to attach. The control pad positions are adjustable, replaceable and vary in sizes.

Control pads 304 are in the forward position preventing the rider's knees from moving forward. Control-pads 305 are in the reward position preventing the rider's knees from moving backward. The section of the control-pad assembly 303 is placed between the seat and motorcycle frame. An area of 303 may need to be cut out or shaped as in 306 to securely fit around various motorcycle parts between the seat and motorcycle frame.

Figure 4A:
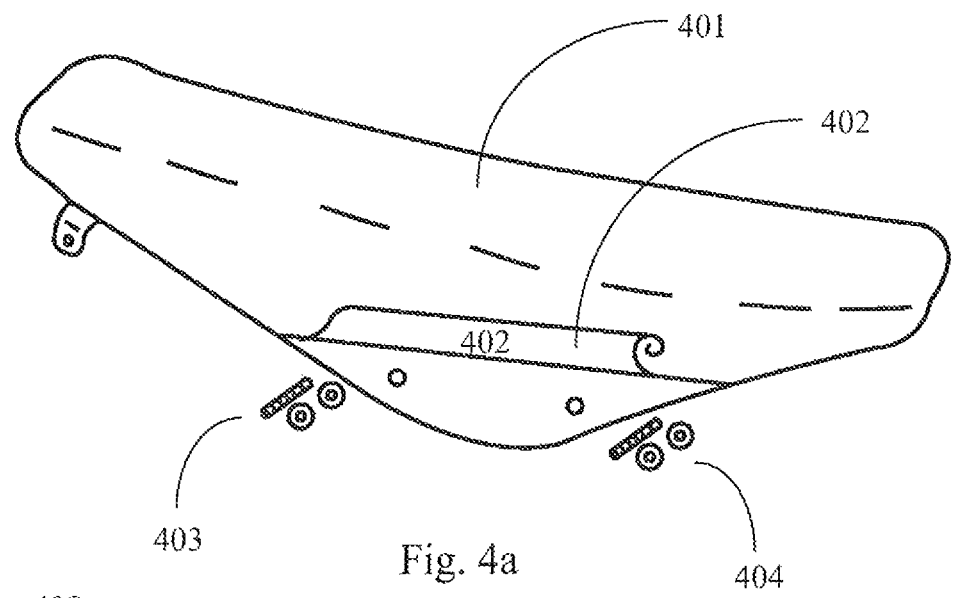
FIG. 4a is a side elevation view of a motorcycle seat with the front pointed to the right showing a means to attach the embodiment of FIG. 4b of present invention.
Figure 4B:
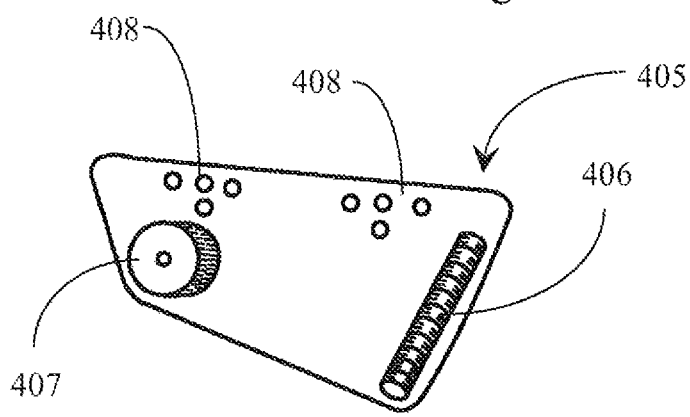
FIG. 4b is embodiment of the invention as it would mount to the motorcycle seat.

Version 3—FIG. 4b) In this embodiment the control-pads 405 are two mirror-image units with two pads 406 & 407 per control pad unit. Each unit 405 is retrofitted to the motorcycle seat 401 by rolling up the seat upholstery 402 onto each side of a stock motorcycle seat. Methods to attach the control pads 405 to the motorcycle seat 401 are illustrated by retrofitting 403 & 404 so that the holes of 408 can provide attachment and adjustment of the control-pad 405 to the motorcycle seat 401. The control-pad positions are adjustable, replaceable and vary in sizes and density of material.

Version 4—FIG. 2a) Each control pad is a separate unit that is attached directly to the motorcycle seat 201 with two pads 203 & 202 on the left side and two pads 203 & 202 on the right side of the motorcycle.

Figure 5:
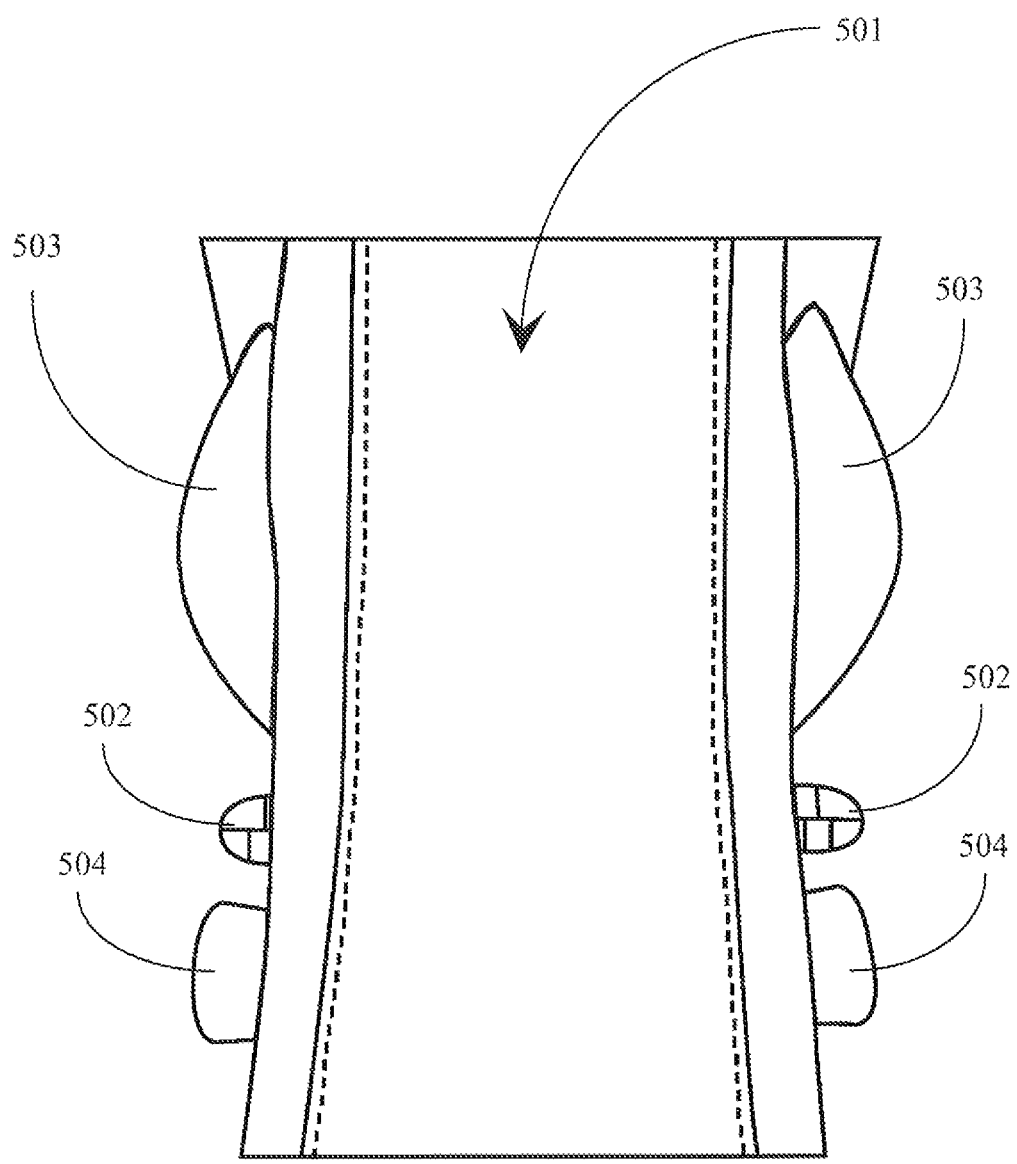
FIG. 5 is a top-down view of the motorcycle seat facing forward, showing elements unique to an embodiment of the invention.

FIG. 5 is a view from above of a motorcycle with a seat 501. Control pads 503 and 504 have been added, one each on each side, to extend horizontally beyond the edge of the seat, such that a rider with feet on foot pegs 502 will have his or her legs on each side between forward pads 503 and rearward pads 504 in a manner that the rider's legs will be constrained between the pads, which will allow the rider to exert force on the pads by the rider's legs to control the rider's motion forward or backward on the seat, which will allow the rider to exert less force on the handlebar mechanism than would be necessary in the absence of the added control pads.

It will be apparent to the skilled person that there are a great many changes that may be made in the embodiments described above as examples. For example, the description of the forward control pads as bars and the rearward control pads as round pucks is not limiting, but exemplary. In some cases the forward and rear control pads may be each a plurality of elements to constrain the rider's legs and provide the rider with additional levels of control of the motorcycle, by affording the rider an ability to control his or her forward and rearward motion and momentum during incidents of acceleration and deceleration. The pads might be formed to the shape of the rider's legs both fore and aft, for example. The number and shape of the control pads may vary greatly, as long as the constraint is provided.

The invention claimed is:

1. A control pad system for a motorcycle, comprising:
two forward control pads configured to engage a forward surface of a rider's knees or legs with the rider's feet on foot pegs of the motorcycle, the forward control pads mounted to be stationary with frame elements of the motorcycle, wherein the position of the forward control pads constrain the rider's legs from forward motion, enabling the rider to exert pressure on the control pads to resist motion relative to the motorcycle induced by instances of deceleration;
two rearward control pads configured to engage a backside surface of the rider's knees or legs with the rider's feet on the foot pegs of the motorcycle, the rearward control pads mounted to be stationary with the frame elements of the motorcycle, wherein the positions of the rearward control pads constrain the rider's legs from rearward motion, enabling the rider to exert pressure on the rearward control pads to resist motion relative to the motorcycle induced by instances of acceleration;
wherein the four control pads are mounted to a saddle-like unit that is placed over the motorcycle frame before a seat is added, and adding the seat secures the saddle-like unit and hence the control pads to the frame elements of the motorcycle.

2. The control pad system of claim 1 wherein each of the forward control pads are in shape of a padded bar to engage the rider's knee, and each of the rearward control pads are in shape of a round puck to engage a back region of the rider's knee.

3. The control pad system of claim 1 wherein all of the four control pads and the saddle-like unit to which they are mounted are made a contiguous part of a seat assembly, and are added to the motorcycle by adding the seat assembly to the motorcycle.

4. The control pad system of claim 1 wherein a first forward control pad of the two forward control pads and a first rearward control pad of the two rearward control pads are secured to a first mounting pad, a second forward control pad of the two forward control pads and a second rearward control pad of the two rearward control pads are secured to a second mounting pad which is a mirror image of the first mounting pad, and each of the mounting pads are fastened to the saddle-like unit which is fastened to the frame of the motorcycle seat under upholstery of the motorcycle seat.

5. The control pad system of claim 1 wherein a first forward control pad of the two forward control pads and a first rearward control pad of the two rearward control pads are secured to a first mounting pad, a second forward control pad of the two forward control pads and a second rearward control pad of the two rearward control pads are secured to a second mounting pad which is a mirror image of the first mounting pad, and each of the mounting pads are fastened to the saddle-like unit, which is fastened to the frame of the motorcycle under the frame of the motorcycle seat.

6. The control pad system of claim 1 wherein one or both of the forward and the rearward control pads each comprise a plurality of elements mounted and arranged to follow the shape of the rider's legs fore and aft.

7. A method for maintaining position on a motorcycle, comprising steps of:
mounting two forward control pads configured to engage a forward surface of a rider's knees or legs with the rider's feet on foot pegs of the motorcycle, one of the forward control pads mounted on each side of a saddle-like unit;
mounting two rearward control pads configured to engage a backside surface of the rider's knee or legs with the rider's feet on the foot pegs of the motorcycle, one of the rearward control pads mounted on each side of the saddle-like unit;
placing the saddle-like unit over a frame of the motorcycle with the seat removed;
mounting a seat to the motorcycle frame, securing the saddle-like unit and the control pads to the motorcycle frame; and
placing the legs between the forward and rearward control pads by the rider, and exerting pressure on the forward and rearward control pads with the knees and legs as necessary to maintain position on the motorcycle during acceleration and deceleration.

8. The method of claim 7 wherein each of the forward control pads are in shape of a padded bar to engage the rider's knee, and each of the rearward control pads are in shape of a round puck to engage a back region of the rider's knee.

9. The method of claim 7 wherein all of the four control pads and the saddle-like unit to which they are mounted are made a contiguous part of a seat assembly, and are added to the motorcycle by adding the seat assembly to the motorcycle.

10. The method of claim 7 wherein a first forward control pad of the two forward control pads and a first rearward control pad of the two rearward control pads are rearward control pad is secured to a first mounting pad, a second forward control pad of the two forward control pads and a second rearward control pad of the two rearward control pads are secured to a second mounting pad which is a mirror image of the first mounting pad, and each of the mounting pads are fastened to the saddle-like unit, which is fastened to the frame of the motorcycle seat under upholstery of the motorcycle seat.

11. The method of claim 7 wherein a first forward control pad of the two forward control pads and a first rearward control pad of the two rearward control pads are secured to a first mounting pad, a second forward control pad of the two forward control pads and a second rearward control pad of the two rearward control pads are secured to a second mounting pad which is a mirror image of the first mounting pad, and each mounting pad is fastened to saddle-like unit, which is fastened to the frame of the motorcycle under the frame of the motorcycle seat.

12. The method of claim 7 wherein one or both of the forward and the rearward control pads each comprise a plurality of elements mounted and arranged to follow the shape of the rider's legs fore and aft.

* * * * *